INVENTOR.
JAMES E. HATFIELD
BY
Kwis Hudson Boughton & Williams
ATTORNEYS

Patented Sept. 18, 1945

2,385,277

UNITED STATES PATENT OFFICE 2,385,277

MACHINE FOR PASTING STORAGE BATTERY GRIDS

James E. Hatfield, Shaker Heights, Ohio, assignor to Willard Storage Battery Company, Cleveland, Ohio, a corporation of West Virginia Application August 28, 1943, Serial No. 500,429

3 Claims. (Cl. 226—39.6)

This invention relates to an improved machine for pasting storage battery grids and particularly to a machine for pasting grids which are thicker than normal.

It has been found that in pasting the thicker grids the interstices of the grids are not completely filled and that vacant spaces occur under the ribs next to the top of the grids, i. e., next to the entrance of the paste from the hopper.

The particular object of the invention is to provide means whereby the grids, regardless of their thickness, are completely filled with paste.

This object is attained by providing on the underside of the grids an auxiliary movable pasting device preferably in the form of an oscillating compressor which during the passage of the grid beneath the paste hopper makes several oscillations and thus serves on each upward movement to push the paste which has passed through the grid upward from the lower side of the grid to the upper side and thus fill the spaces occurring beneath the ribs at the top thereof.

The invention may be further briefly summarized as consisting in certain novel details of construction and combinations and arrangements of parts which will be described in the specification and set forth in the appended claims.

In the accompanying sheets of drawings.

Figure 2:
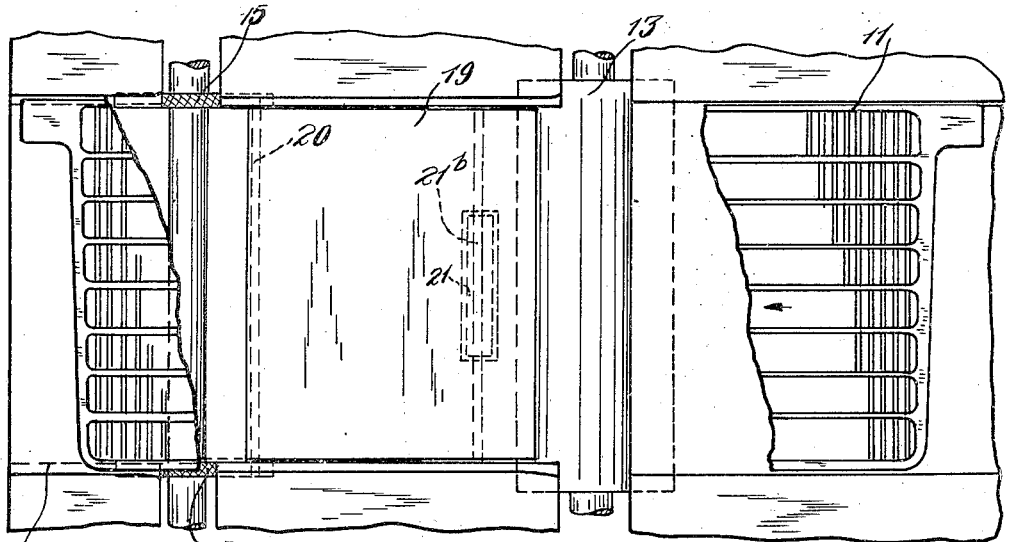
Fig. 2 is a top plan view of the same with the paste hopper removed and certain other parts broken away.

Referring now to the drawings, 10 represents the paste hopper the construction of which will be described shortly. Beneath this hopper the grids 11 are fed in continuous succession along a suitable trackway by upper and lower knurled rollers 12 and 13 which extend the entire width of the grids on the side in advance of the hopper and, after the grids are pasted, they are fed by relatively short upper and lower knurled rollers 14 and 15 which simply engage the edge portions of the pasted plates, these plates then passing along guide rails 16.

In the paste hopper 10, which is preferably of rectangular construction, there is provided in the upper part thereof a pair of rotating pushers 17 which feed the paste downwardly to a paste pump 18 consisting of a pair of meshing gears or two wheels with meshed teeth that develop considerable pressure and thus force the paste into and through the grids. It will be noted that the shafts carrying the pushers 17 are connected by gearing 17a so as to rotate in unison, but in opposite directions. However, the same is not true of the pump 18, even though the two wheels have meshed teeth and are rotated in opposite directions. Considerable pressure is imposed on these two toothed wheels and they are preferably separately driven by two shafts 18a which are properly geared to the motor.

Figure 1:
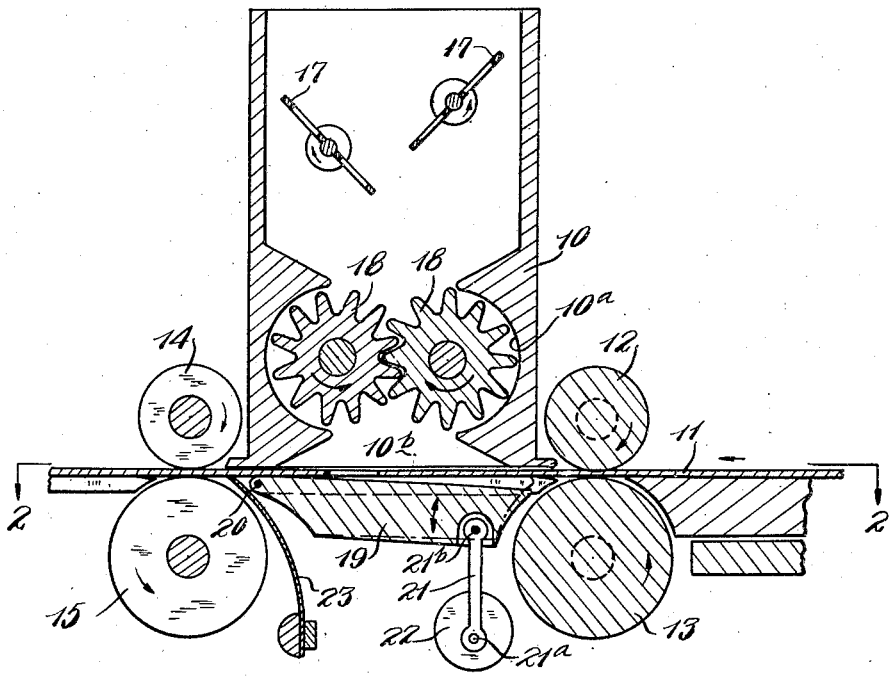
Fig. 1 is a longitudinal sectional view substantially along the line 1—1 of Fig. 3, showing a pasting machine involving my invention.
Figure 3:
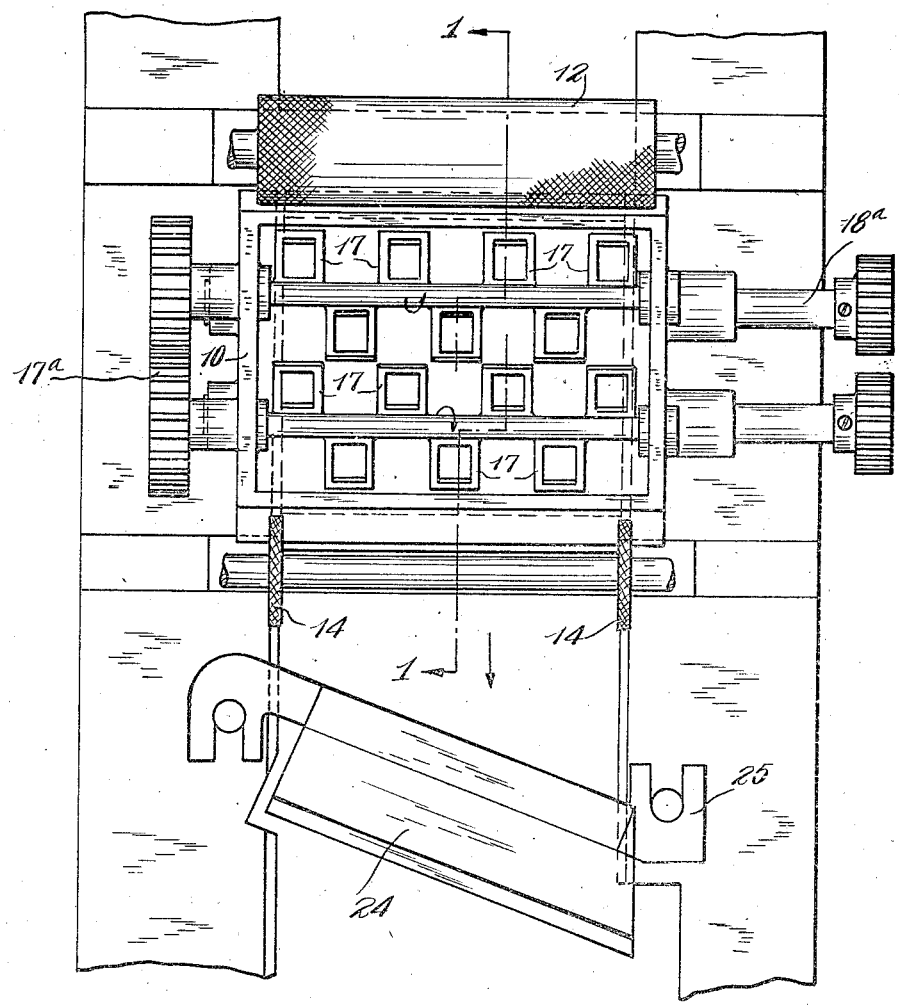
Fig. 3 is a top plan view of the machine with the paste hopper applied.

These toothed wheels 18, which rotate in the directions indicated by the arrows in Fig. 1, pick up the paste fed to them by the pushers 17 and force the paste downwardly between the teeth and the curved walls 10a at the lower part of the hopper to a flaring outlet opening 10b which is located immediately above the feed of the plates 11.

As stated above, the pump or toothed wheels 18 force the paste into and through the grids, and underneath the outlet opening 10b of the hopper below the feed of the grids there is provided a device which pushes the paste back up into the grids from the lower side thereof so as to completely fill the interstices of the grids. This device preferably consists of a member 19 which is pivoted at 20 at the far end of the outlet opening 10b where it is substantially flush with the undersides of the grids, and it is given oscillating movement such that in its elevated position it is substantially flush with the lower faces of the grids and in its lowermost position it is a suitable distance away from the grids. The oscillating member 19 is given fairly rapid movement to and away from the grids by means of a connecting rod 21 connected at its lower end to an offset point 21a of a rotating wheel or equivalent member 22 which is driven by the motor (not shown), and at its upper end is connected at 21b to the center of the underside of the oscillating member 19, as shown by full lines in Fig. 1 and by dotted lines in Fig. 2.

Close to the rollers 14 and 15 is a scraper 23 which scrapes the lower sides of the grids free of excess paste. This bottom scraper 23 cooperates with the edge of the hopper 10 so as to prevent the scraper from forcing any paste out of the grids. Beyond the rollers 14 and 15 there is an upper scraper 24 which scrapes the upper sides of the grids free of excess paste and a similar lower scraper which frees the lower sides of the grids of excess paste. This scraper 24 is mounted in a suitable holder 25. Only the upper scraper 24 is here shown, and it will be understood that the lower scraper will in the main be similar to the scraper 24.

The oscillating member 19 is given several oscillations during the passage of each grid beneath the opening 10b of the hopper, and at each oscillation it pushes the paste upwardly so as to compact it and entirely fill the interstices and bring the paste up against the undersides of the uppermost ribs of the grids.

I prefer to employ an oscillating device rather than one which moves bodily vertically since by the oscillating movement I obtain a graduated pasting action or upward movement of the paste, the pivoted end 20 of the oscillating member having substantially the action of a scraper to smooth the lower surface of the grids.

It will be understood that the rotating pushers 17 and the pump 18, as well as the several knurled rollers and the oscillating member 19 and the wheel 22 which operates the oscillating member 19, will be suitably connected to a motor so as to be driven continuously thereby.

While this invention is described particularly for pasting grids which are thicker than normal, it has utility also in pasting the smaller grids or grids of any size or thickness.

While I have shown the preferred construction only, I do not desire to be confined to the precise details shown but aim in my claims to cover all modifications which do not involve a departure from the spirit and the scope of my invention.

Having thus described my invention, I claim:

1. In a pasting machine, means for feeding grids along a given path, a paste hopper above the grids having means for feeding the paste from the hopper into and through the grids, a movable auxiliary pasting device operating from the lower side of the grids and serving to push up into the grids the paste that is forced through them by the paste feeding means, and means for moving said device alternately toward and from the grids.

2. In a pasting machine, means for feeding grids along a given path, a paste hopper above the grids having means for feeding the paste from the hopper into and through the grids, a device mounted for oscillatory movement beneath the outlet opening of the paste hopper and below the line of feed of the grids, and means for oscillating said device to push the paste into the grids from the lower side thereof.

3. In a pasting machine, a hopper for feeding paste into grids comprising pusher means toward the top of the hopper and a pump near the lower end of the hopper and comprising a pair of toothed members for feeding paste between said members and the walls of the hopper to an opening at the bottom of the hopper, and a pasting device mounted for oscillatory movement and operating on the lower side of the grids and serving to push up into the grids the paste that is forced through them by the pump, and means for giving said pasting device an oscillatory movement.

JAMES E. HATFIELD.